United States Patent [19]

Verdier

[11] Patent Number: 5,232,655
[45] Date of Patent: Aug. 3, 1993

[54] NUCLEAR FUEL ASSEMBLY SKELETON

[75] Inventor: Michel Verdier, Villeurbanne, France

[73] Assignees: Framatome, Courbevoie; Compagnie Generale Des Matieres Nucleaires, Villacoublay, both of France

[21] Appl. No.: 811,650

[22] Filed: Dec. 23, 1991

[30] Foreign Application Priority Data

Dec. 21, 1990 [FR] France ............... 90 16121

[51] Int. Cl.[5] .............................................. G21C 7/06
[52] U.S. Cl. ........................................ 376/219; 376/353
[58] Field of Search ............... 376/446, 449, 285, 353, 376/219; 976/DIG. 127, DIG. 242, DIG. 246; 411/44, 45, 54, 59, 339

[56] References Cited

U.S. PATENT DOCUMENTS

| | | | |
|---|---|---|---|
| 3,855,060 | 12/1974 | Dietrich et al. | 376/219 |
| 4,126,767 | 11/1978 | Bevilacqua et al. | 376/230 |
| 4,617,171 | 10/1986 | Feutrel | 376/446 |
| 4,684,499 | 8/1987 | Gjertsen et al. | 376/446 |
| 4,714,582 | 12/1987 | Denizou | 376/233 |
| 4,716,004 | 12/1987 | Merkovsky et al. | 376/203 |
| 4,844,859 | 7/1989 | Coussau | 376/353 |

Primary Examiner—Donald P. Walsh
Assistant Examiner—Meena Chelliah
Attorney, Agent, or Firm—Pollock, Vande Sande & Priddy

[57] ABSTRACT

A nuclear fuel assembly comprises a skeleton that constitutes the structure of the assembly and that holds a bundle of fuel elements at nodes in a regular array. The skeleton comprises two end pieces interconnected by guide tubes. The connection between each guide tube and the lower end piece comprises a peg formed with a coolant flow hole having a top portion fixed in the guide tube and a projecting bottom portion, which has a downwardly facing shoulder for bearing on the lower end piece, which passes through a passage formed in the lower end piece, and which is divided into a plurality of resilient fingers each having an upwardly facing shoulder for catching on the lower end piece.

11 Claims, 2 Drawing Sheets

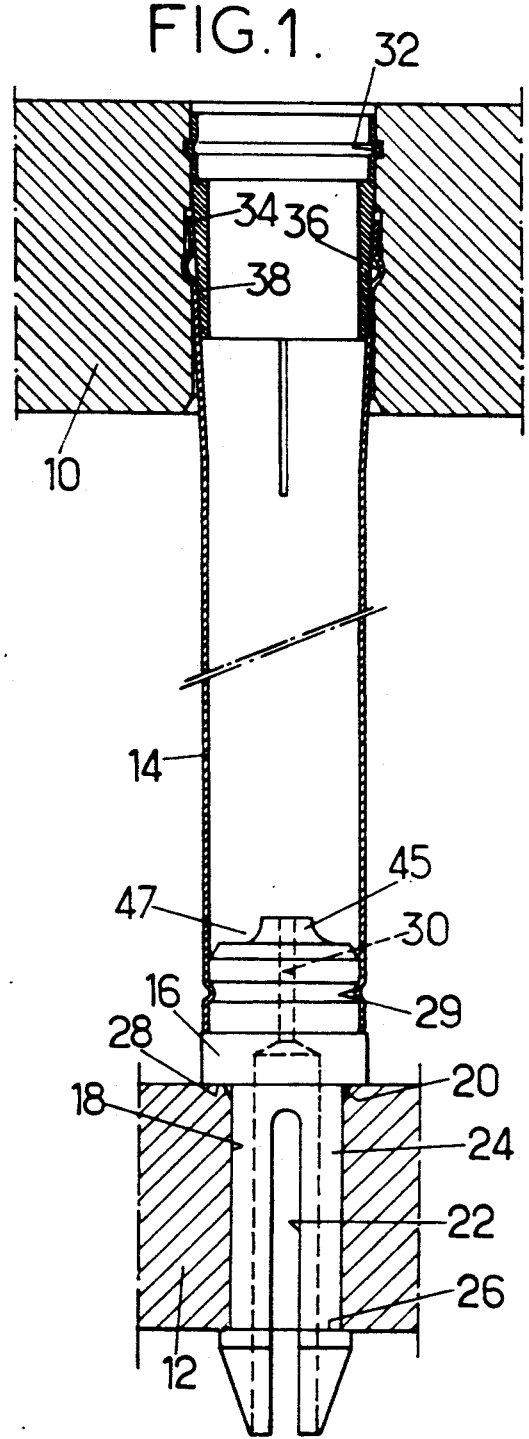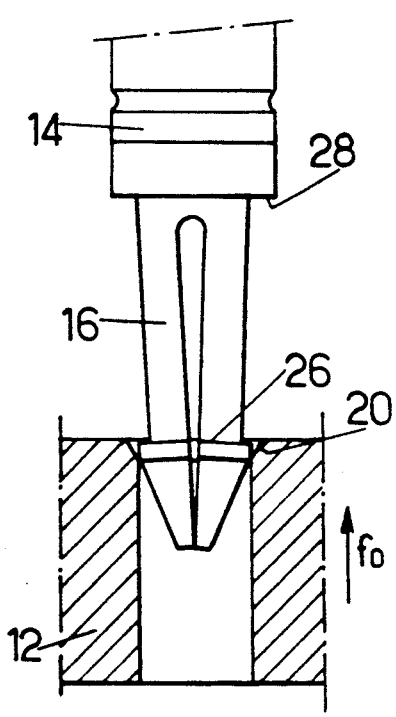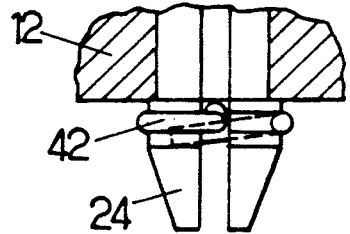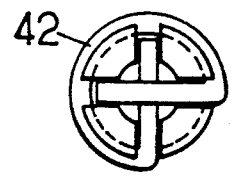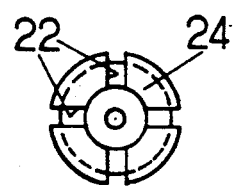

NUCLEAR FUEL ASSEMBLY SKELETON

BACKGROUND OF THE INVENTION

The invention relates to nuclear fuel assemblies, and more particularly to fuel assemblies comprising a skeleton that constitutes the structure of the assembly and that holds a bundle of fuel elements at nodes in a regular array. Such assemblies are used, in particular, in reactors that are cooled and moderated by light water. The skeleton then comprises two end pieces interconnected by guide tubes which carry grids that are distributed along the guide tubes and that retain the fuel elements at the nodes of the array.

The guide tubes are designed to receive elements belonging to absorbent clusters for controlling the reactivity and/or to clusters for varying the energy spectrum of neutrons. To attenuate the shock caused by the clusters dropping in the event of an emergency stop of the reactor, the guide tubes are often designed to act as hydraulic dampers by providing them with bottom plugs that are formed with respective narrow passages. Such a plug may also be used to receive the guide tube to the lower end piece (FR-A-2,469,777).

In general, the end pieces are made of a material having high mechanical properties, such as stainless steel or one of the alloys known under the name Inconel, while the guide tubes are made of a zirconium base alloy. Consequently, it is difficult to secure the tubes to the end pieces directly by welding. In addition, it is desirable for the connection of the guide tubes to at least one of the end pieces to be easily disassembled and reassembled so as to allow faulty elements to be replaced.

SUMMARY OF THE INVENTION

It is an object of the invention to provide an assembly skeleton of the above-defined kind in which connection means can be made in a manner that is relatively simple and of acceptable cost.

To this end, the present invention provides, in particular, a skeleton comprising two end pieces interconnected by guide tubes, in which the connection means between each guide tube and the lower end piece comprise a peg formed with a coolant flow hole, having a top portion fixed in the guide tube and a projecting bottom portion, which has a downwardly facing shoulder for bearing on the lower end piece, which passes through a passage formed in the lower end piece, and which is divided into a plurality of resilient fingers each having an upwardly facing shoulder for catching on the bottom end piece.

Advantageously, the end portion of the peg beyond the upwardly facing shoulder tapers so that a vertical thrust exerted on the guide tube causes the resilient fingers to move toward one another, thereby enabling the peg to be inserted until its fingers snap into place. The passage through the end piece is constituted by a simple cylindrical machined hole which may open at its top end via a chamferin to facilitate peg insertion.

In order to ensure that the fingers are sufficiently resilient and that they retain their resilience under irradiation, the peg is advantageously made of a material having proven mechanical properties, such as Inconel 718. The peg can then be fixed to the guide tube, which is generally made of a zirconium-based alloy, by circularly crimping the guide tube into a groove formed in the peg.

To avoid any danger of undesirable peg release, e.g., in the event of a reduction in resilience, means may be provided for installing after snap fastening to prevent the fingers moving towards one another. These means may be constituted, in particular, by a locking ring received in a groove in the peg and having its ends inserted in the slots between the fingers.

The connection between the guide tubes and the upper end piece may be implemented by any conventional means, e.g., a connection using threaded sockets of the kind described in French Patent Application No. 7923312 or a connection by crimping the top portion of the guide tube in a recess in the upper end piece, with locking by means of a force fit ring.

BRIEF DESCRIPTION OF THE DRAWINGS

The invention will be more clearly understood on reading the following description of a particular embodiment of the invention and of modifications thereof given by way of example. The description refers to the accompanying drawings, in which FIG. 1 is an elevation view in partial cross-section showing the connections between a guide tube and the end pieces of an assembly;

FIG. 2 is a view of the underside of FIG. 1;

FIG. 3 shows the configuration of the snap-fastening fingers of the securing means while they are being inserted in the lower end piece;

FIG. 4 is similar to a portion of FIG. 1 and shows a second embodiment;

FIG. 5 is a view of the underside of FIG. 4;

DETAILED DESCRIPTION

Figure 7:
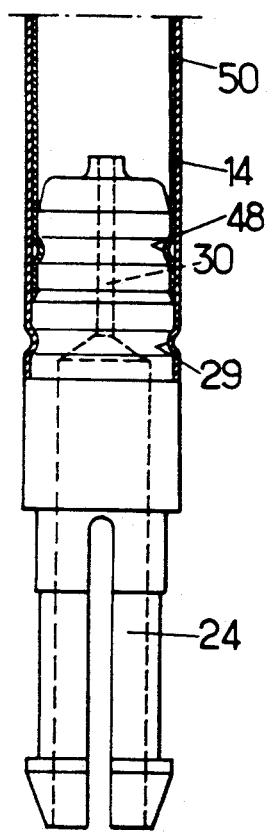
FIG. 7 is similar to a portion of FIG. 1 and shows a third embodiment.

The skeleton portion shown in FIG. 1 may belong to a skeleton having the same general structure as that of conventional fuel assemblies for pressurized water reactors, i.e., having an upper end piece 10 and a lower end piece 12 both formed with openings for passing coolant and interconnected by guide tubes 14 which carry grids (not shown). Such a skeleton structure will not be described since it is fully disclosed in numerous prior publications, e.g., EP-A-0187578, providing a description of an assembly that can be modified to implement the invention.

Each of the guide tubes 14 of the type shown in FIG. 1 is connected to the lower end piece by means constituting a particular embodiment of the invention and enabling easy disassembly while nevertheless being simple in structure. The portion of these means belonging to the end piece 12 consists of a bore 18 which advantageously includes an inlet chamfer 20 to facilitate insertion of the means carried by the guide tubes 14 into the end piece. The portion of the means carried by the guide tube is constituted as a simple peg 16 whose top portion is fixed in the tube 14 and whose bottom portion is divided by slots 22 into a plurality of fingers 24 (there being four fingers separated by two slots in a cross configuration in the embodiment shown in FIGS. 1 and 2). The fingers are sufficiently thin to be resilient. The bottom portion terminates as a tapered region constituting a cone that facilitates insertion of the peg into the bore 18.

Each finger 24 includes a shoulder 26 disposed at the base of the tapered region and located at a distance from a shoulder 28 between the top and bottom portions of the peg that is equal to the thickness of the end piece 12. The extent to which the shoulder 26 projects and the width of the slots 22 are selected so that the fingers, when in their relaxed state, are held captive in the lower end piece, but when the fingers are bent inwardly, the shoulders 26 can pass along and within of wall 18.

The guide tubes 14 are generally made of a zirconium base alloy such as one of the alloys known under the name "Zircaloy" whose mechanical properties, particularly after irradiation, are insufficient for making peg 16. The peg is advantageously made of stainless steel or of one of the alloys known under the name "Inconel", which is difficult to weld to zirconium base alloys.

For that reason, the pegs 16 are generally fixed to the guide tubes 14 by crimping. In that example shown in FIG. 1, each guide tube 14 bears against a shoulder of the top portion of the respective peg and is fixed by crimping in a groove 29 in the top portion using a technique that is well-known.

To allow a throttled flow of coolant through the peg, thereby obtaining hydraulic damping in the event of an element dropping inside the guide tube 14, a small diameter hole 30 is generally formed along the axis of the top portion of the peg 16, opening out between the fingers 24. The projecting portion 45 may be designed to define a dead volume 47 suitable for receiving small debris and for preventing blockage of hole 30.

The guide tubes may be fixed to the upper end piece 10 by known structural means. In particular, when it is desired to be able to disassemble and reassemble the end piece simply, e.g., to replace the elements, threaded sockets may be used that are provided with respective thin skirts which are deformable in notches of the end piece in order to prevent them from rotating (see FR-A-2465916).

In the embodiment shown in FIG. 1, the connection between each guide tube 14 and the upper end piece 10 is made by crimping. To this end, the passage for receiving a guide tube in the end piece comprises in succession from top to bottom: a cylindrical portion in which a crimping groove 32 is formed; a slightly flared portion separated from the cylindrical portion by a shoulder 34 and having a crimping groove 36; and a cylindrical bottom portion. The connection is performed as follows: The guide tube is inserted into the end piece and is positioned axially relatively thereto. It is crimped by deformation into the groove 36. The danger of separation is avoided by forcibly inserting a ring 38 having a top thin skirt which is deformed into groove 32.

As shown in FIG. 3, the lower end piece 12 is installed on the guide tubes 14 advantageously held in their set positions by crossed combs, merely by displacing the end piece 12 in the direction indicated by arrow $f_0$. The pressure of the bevel 20 on the tapered end of the peg 16 causes the fingers thereof to bend. When the end piece 12 comes into abutment against the shoulder 28, the fingers 28 have just passed through the end piece and spread apart. The shoulders 26 snap behind the end piece.

The embodiment shown in FIGS. 4 and 5 differs from that described above by including means that are easily installed and removed for preventing the fingers from moving towards one another when they are in place.

These means, shown by way of example, are constituted by a ring 42 extending over an angle of 270° and terminated by rectilinear portions that are inserted in the slots between the fingers 24. The ring is retained in a groove in the peg and prevents the fingers from moving towards one another. Assembly is performed as in the embodiment of FIGS. 1 to 3. The ring is installed in the groove situated beneath the end piece 12 after fingers have snapped into place.

Figure 6:
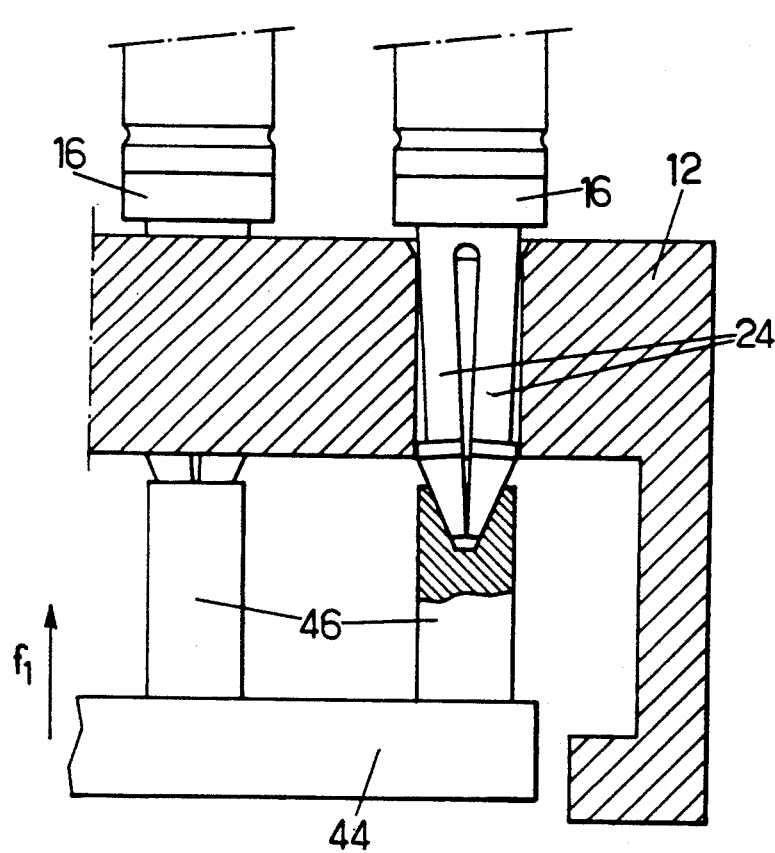
FIG. 6 is a diagram showing a portion of a disassembling tool suitable for expelling the guide tubes from the lower end piece.

The lower end piece can be disassembled very easily. Optionally, after removing the rings 42, all of the pegs are pushed back simultaneously using a single tool 44 provided with studs 46 having respective conical bearing surfaces. As shown in FIG. 6, moving the tool in the direction of arrow $f_1$ successively causes the fingers 24 to move towards one another and then the guide tubes to move upwardly. It will also be possible to lower the pegs of the tool 44 and then to pull the end piece 12 downwardly. The tool may also be used during assembly to avoid excessive friction between the fingers and the end piece.

In a third embodiment, shown in FIG. 7, the radial thickness of fingers 24 decreases towards their ends, thereby optimizing the stresses in the fingers 24 and their stiffness. This result is easily obtained by cutting the fingers out from a blank that has two or more diameters in succession.

In the embodiment of FIG. 7, the top portion of the peg includes a second circumferential groove 48. This groove may be used to make a second crimp on the guide tube 14. However, by providing the groove in a reduced-diameter region of the top portion, it also makes it possible to crimp a tubular cartridge 50 which is considerably shorter than the guide tube. The cartridge, which is generally a few tenths of millimeter thick, has the function of throttling the upward leakage path in the event that an element drops down inside the guide tube, and it therefore acts as an hydraulic damper. The cartridge 50 is mounted as a sliding fit inside the guide tube and is capable of bearing on a shoulder of the top portion and of being crimped in the groove 48 before the guide tube is put into place and crimped.

Whichever embodiment is adopted, the connection between the guide tubes 14 and the bottom end piece 12 is achieved by means that are simple, comprising a single piece in addition to the guide tubes and the end piece. Manufacturing and inspection costs are small. Assembly time in the factory is short, as is the time required for any subsequent disassembly and reassembly operations.

I claim:

1. A nuclear fuel assembly skeleton for holding a bundle of fuel elements at nodal points of a regular array, said skeleton comprising
   (a) a lower end piece;
   (b) an upper end piece;
   (c) a plurality of guide tubes carrying grids for distributing along the guide tubes for retaining said fuel elements at said nodal points, and which interconnect the upper end piece and the lower end piece;
   (d) means securely connecting each of said guide tubes to said upper end piece; and
   (e) connection means between each of said guide tubes and said lower end piece which comprise a peg formed with a restricted coolant flow hole, said peg having an upper portion fixed in the respective guide tube and a downwardly projecting lower portion which has a downwardly facing shoulder for bearing on the lower end piece, which passes through a passage formed in the lower end piece, and which is divided into a plurality of radially flexible resilient fingers each having an upwardly facing shoulder for catching on a lower surface of the lower end piece, said peg having a lowest tapering portion beyond said upwardly facing shoulder, whereby a vertical thrust exerted on the guide tube causes the resilient fingers to flex radially towards one another thereby enabling the peg to be inserted until the fingers thereof snap into place.

2. Skeleton according to claim 1, wherein a lowest portion of the peg, beyond said upwardly facing shoulder, tapers whereby a vertical thrust exerted on the guide tube causes the resilient fingers to flex radially towards one another thereby enabling the peg to be inserted until the fingers thereof snap into place.

3. Skeleton according to claim 1, wherein each said passage is a cylindrical machined hole opening at the top end thereof via a chamfer.

4. Skeleton according to claim 1, wherein each of said guide tubes is of zirconium-base alloy and each of said pegs is of stainless steel or Inconel, and is fixed to the respective guide tube by crimping said tube into a circular groove of said peg.

5. Skeleton according to claim 1, further comprising removable means insertable between said fingers for preventing movement thereof toward each other.

6. Skeleton according to claim 5, wherein said removable means comprise a resilient open ring insertable into a groove in said peg and having end portions insertable between said fingers.

7. Skeleton according to claim 1, wherein a top part of each said peg has a central upwardly directed projection defining, with the respective guide tube, an annular debris collection annular volume.

8. Skeleton according to claim 4, wherein each said peg is formed with a second circumferential groove and a flow throttling tubular cartridge shorter than and inserted in the guide tube is crimped into said second groove.

9. Skeleton according to claim 1, wherein said fingers have a radial thickness that decreases towards their lower ends.

10. Skeleton according to claim 1, wherein each said guide tube is crimped in a recess in the upper end piece and locked therein by a force fit ring.

11. In a nuclear fuel assembly, a skeleton for holding a bundle of fuel elements at nodal points of a regular array, said skeleton comprising a lower end piece, an upper end piece, a plurality of guide tubes for retaining said fuel elements at said nodal points and interconnecting the upper end piece and the lower end piece, and connection means between each of said guide tubes and said lower end piece, said connecting means comprising (a) a peg formed with a coolant flow hole, having an upper portion securely fixed in the respective guide tube and a lower portion which has a downwardly facing shoulder for bearing on an upper surface of said lower end piece, which passes through a passage formed in the lower end piece, and which is divided into a plurality of radially flexible resilient fingers each having an upwardly facing shoulder for catching on a lower surface of said lower end piece; and (b) removable means manually insertable between said fingers for preventing radial movement of said fingers toward each other and retaining said fingers in engagement with said lower surface.

* * * * *